S. W. CAMPBELL & J. C. EVANS.
Improvement in Grain-Steaming Apparatus.

No. 125,934. Patented April 23, 1872.

Witnesses:
P. C. Dieterich
Geo. W. Mabee

Inventor:
S. W. Campbell
James C. Evans
Munn & Co
Attorneys.

125,934

UNITED STATES PATENT OFFICE.

SAMUEL W. CAMPBELL AND JAMES C. EVANS, OF KANSAS CITY, MISSOURI.

IMPROVEMENT IN GRAIN-STEAMING APPARATUS.

Specification forming part of Letters Patent No. 125,934, dated April 23, 1872.

Specification describing a new and Improved Grain-Steaming Apparatus, invented by SAMUEL W. CAMPBELL and JAMES C. EVANS, of Kansas City, in the county of Jackson and State of Missouri.

Figure 1:
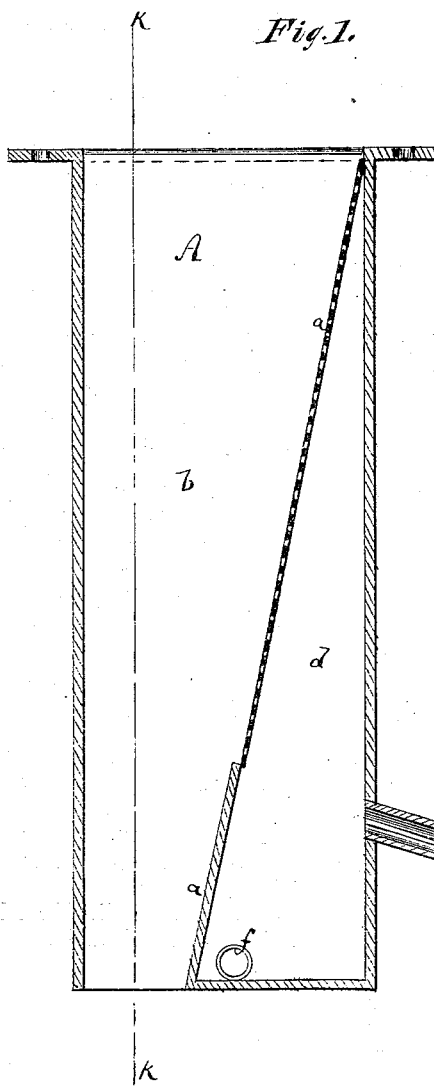
Figure 2:
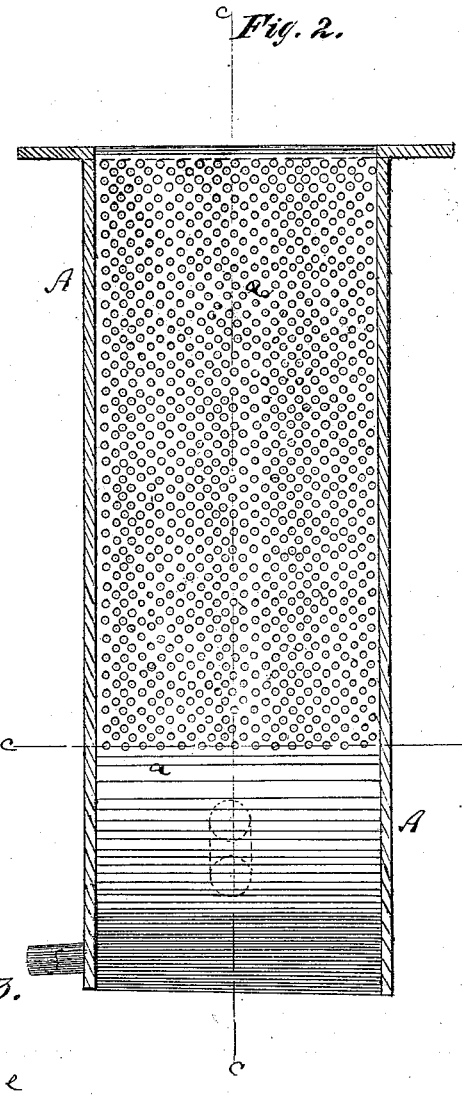
Figure 3:
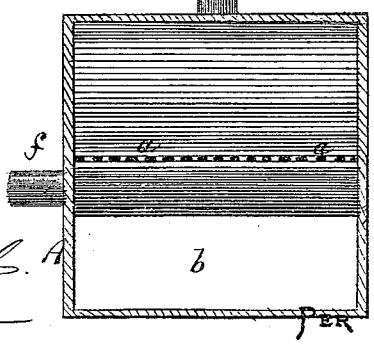

Figure 1 represents a vertical central section of our improved grain-steaming apparatus, the line $c\ c$, Fig. 2, indicating the plane of section. Fig. 2 is a vertical section of the same on the line $k\ k$, Fig. 1. Fig. 3 is a horizontal section of the same on the line $c\ k$, Fig. 2.

Similar letters of reference indicate corresponding parts.

This invention relates to a new apparatus for steaming wheat or other grain preparatory to its introduction to a grind-mill, with the object of thereby toughening the bran and preventing the flour from being specked by small particles of the bran. The invention consists in the arrangement of a vessel containing a perforated inclined partition, over which the grain moves in its passage to the mill, and through which the steam reaches the grain.

A in the drawing represents a vessel, made of sheet metal or other material, of prismatic or other convenient form, and containing an inclined perforated partition, $a$, which divides it into two compartments, $b$ and $d$. The compartment $b$ is large on top and small at the lower end, and open at both ends. The compartment $d$, quite narrow on top and large at the bottom, is closed at both ends. Steam enters the compartment $d$ through a pipe, $e$, and products of condensation can be withdrawn through a pipe, $f$, the lower part of the partition $a$ being not perforated, in order to allow some water to gather in $d$ without flowing into $b$. The pipe $e$ has a suitable stop-cock to permit a convenient regulation of the quantity of steam admitted.

The grain passes through the compartment $b$ during its passage to the mill, and is, in $b$, exposed to contact with the steam which passes through the perforated partition. The apertures in $a$ are too small to let the grain pass through.

The upper and lower openings of the compartment $b$ may have slides, by which the entrance and discharge of the grain can be regulated.

Having thus described our invention, we claim as new and desire to secure by Letters Patent—

The vessel, containing perforated partition $a$ and pipes $e\ f$, substantially as and for the purpose set forth.

SAMUEL W. CAMPBELL.
  JAMES C. EVANS.

Witnesses:
 J. M. MYERS,
 F. R. LONG.